US 9,398,082 B2

(12) United States Patent
Boggs et al.

(10) Patent No.: US 9,398,082 B2
(45) Date of Patent: *Jul. 19, 2016

(54) SOFTWARE APPLIANCE MANAGEMENT USING BROADCAST TECHNIQUE

(71) Applicant: RED HAT, INC., Raleigh, NC (US)

(72) Inventors: Joseph Boggs, Fayetteville, NC (US);
Norman Lee Faus, Raleigh, NC (US);
David P. Huff, Raleigh, NC (US); Bryan Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,048

(22) Filed: Sep. 19, 2014

(65) Prior Publication Data

US 2015/0006704 A1 Jan. 1, 2015

Related U.S. Application Data

(63) Continuation of application No. 12/129,356, filed on May 29, 2008, now Pat. No. 8,868,721.

(51) Int. Cl.
*H04L 12/26* (2006.01)
*H04L 29/08* (2006.01)
*H04L 29/06* (2006.01)
*G06F 11/14* (2006.01)

(52) U.S. Cl.
CPC ............... *H04L 67/10* (2013.01); *H04L 43/08* (2013.01); *H04L 43/0817* (2013.01); *H04L 63/10* (2013.01); *H04L 67/12* (2013.01); *H04L 67/22* (2013.01); *G06F 11/1433* (2013.01)

(58) Field of Classification Search
CPC ................................ H04L 67/10; H04L 43/08
See application file for complete search history.

(56) References Cited

U.S. PATENT DOCUMENTS

| 6,367,077 | B1 | 4/2002 | Brodersen et al. |
| 6,393,569 | B1 | 5/2002 | Orenshteyn |
| 6,463,457 | B1 | 10/2002 | Armentrout et al. |
| 6,578,199 | B1 | 6/2003 | Tsou et al. |
| 6,915,278 | B1* | 7/2005 | Ferrante ............... G06F 21/105 380/201 |
| 7,140,028 | B2 | 11/2006 | Bentley et al. |
| 7,260,818 | B1* | 8/2007 | Iterum .................... G06F 8/71 717/102 |
| 7,313,796 | B2 | 12/2007 | Hamilton, II et al. |

(Continued)

OTHER PUBLICATIONS

Liu, Huan; "Rapid Application Configuration in Amazon Cloud using Configurable Virtual Appliances", 2011 ACM, SAC'11 Mar. 21-15, 2011, Taiwan, pp. 147-154; <http://dl.acm.org/citation.cfm?id+1982185.1982221&coll=DL&dl=GUIDE&CFID=268649706&CFTOKEN=27442775>.

(Continued)

*Primary Examiner* — Linglan Edwards
(74) *Attorney, Agent, or Firm* — Lowenstein Sandler LLP (57) ABSTRACT

Broadcasts identifying executed execution states and configurations of a plurality of virtual machines may be received. Each of the broadcasts may be received from a client system of a plurality of client systems. At least two of the virtual machines may be installed on each of the plurality of client systems. A determination may be made as to whether a first virtual machine of the plurality of virtual machines that is installed on a first client system of the plurality of client systems is unauthorized in view of an execution state of the first virtual machine and a configuration of a second virtual machine of the plurality of virtual machine. A control action for the first client system may be generated when the first virtual machine is determined to be unauthorized.

20 Claims, 4 Drawing Sheets

(56) References Cited

U.S. PATENT DOCUMENTS

| | | | |
|---|---|---|---|
| 7,439,937 B2 | 10/2008 | Ben-Shachar et al. | |
| 7,461,095 B2 | 12/2008 | Cohen et al. | |
| 7,487,494 B2* | 2/2009 | Chan | G06F 8/316 717/127 |
| 7,509,416 B1* | 3/2009 | Edwardson | G06F 15/16 709/224 |
| 7,529,785 B1 | 5/2009 | Spertus et al. | |
| 7,546,462 B2 | 6/2009 | Upton | |
| 7,577,722 B1 | 8/2009 | Khandekar et al. | |
| 7,596,620 B1 | 9/2009 | Colton et al. | |
| 7,624,394 B1 | 11/2009 | Christopher, Jr. | |
| 7,747,730 B1* | 6/2010 | Harlow | H04L 12/2697 709/202 |
| 7,793,288 B2 | 9/2010 | Sameske | |
| 7,886,038 B2 | 2/2011 | Ferris | |
| 7,891,012 B1* | 2/2011 | Kiel | G06F 21/554 713/176 |
| 7,945,897 B1 | 5/2011 | Cook | |
| 7,996,648 B2 | 8/2011 | England et al. | |
| 8,074,201 B2 | 12/2011 | Ghercioiu et al. | |
| 8,108,912 B2 | 1/2012 | Ferris | |
| 8,176,094 B2 | 5/2012 | Friedman | |
| 8,181,174 B2 | 5/2012 | Liu | |
| 8,201,144 B2 | 6/2012 | Rogers et al. | |
| 8,239,509 B2 | 8/2012 | Ferris et al. | |
| 8,255,650 B1 | 8/2012 | Gruttadauria et al. | |
| 8,458,658 B2 | 6/2013 | Faus et al. | |
| 8,504,433 B2 | 8/2013 | Vadhri et al. | |
| 8,949,426 B2 | 2/2015 | Morgan | |
| 2001/0039497 A1 | 11/2001 | Hubbard | |
| 2002/0029326 A1 | 3/2002 | Reuter et al. | |
| 2002/0035604 A1 | 3/2002 | Cohen et al. | |
| 2002/0069213 A1 | 6/2002 | Moslander et al. | |
| 2002/0069276 A1 | 6/2002 | Hino et al. | |
| 2002/0086688 A1 | 7/2002 | Kang | |
| 2002/0112171 A1 | 8/2002 | Ginter et al. | |
| 2002/0129352 A1 | 9/2002 | Brodersen et al. | |
| 2002/0152372 A1 | 10/2002 | Cole et al. | |
| 2002/0165819 A1 | 11/2002 | McKnight et al. | |
| 2002/0188869 A1 | 12/2002 | Patrick | |
| 2003/0023839 A1 | 1/2003 | Burkhardt et al. | |
| 2003/0033612 A1 | 2/2003 | Schwalb | |
| 2003/0037258 A1 | 2/2003 | Koren | |
| 2003/0110252 A1 | 6/2003 | Yang-Huffman | |
| 2003/0121024 A1 | 6/2003 | Hill et al. | |
| 2003/0135609 A1 | 7/2003 | Carlson et al. | |
| 2003/0160823 A1 | 8/2003 | Stannard | |
| 2003/0220835 A1 | 11/2003 | Barnes, Jr. | |
| 2004/0044998 A1 | 3/2004 | Wildhagen et al. | |
| 2004/0153703 A1 | 8/2004 | Vigue et al. | |
| 2004/0162902 A1 | 8/2004 | Davis | |
| 2004/0177342 A1 | 9/2004 | Worley, Jr. | |
| 2004/0181773 A1 | 9/2004 | Mortensen et al. | |
| 2004/0193953 A1 | 9/2004 | Callahan et al. | |
| 2004/0199572 A1 | 10/2004 | Hunt et al. | |
| 2004/0210591 A1 | 10/2004 | Hirschfeld et al. | |
| 2004/0210627 A1 | 10/2004 | Kroening | |
| 2004/0210893 A1 | 10/2004 | Chamberlain et al. | |
| 2004/0268347 A1 | 12/2004 | Knauerhase et al. | |
| 2005/0044541 A1 | 2/2005 | Parthasarathy et al. | |
| 2005/0044546 A1 | 2/2005 | Niebling et al. | |
| 2005/0071847 A1 | 3/2005 | Bentley et al. | |
| 2005/0125513 A1 | 6/2005 | Sin-Ling Lam et al. | |
| 2005/0131898 A1 | 6/2005 | Fatula, Jr. | |
| 2005/0144060 A1 | 6/2005 | Chen et al. | |
| 2005/0149447 A1 | 7/2005 | Sherkow | |
| 2005/0182727 A1 | 8/2005 | Robert et al. | |
| 2005/0198628 A1 | 9/2005 | Graham et al. | |
| 2005/0262549 A1 | 11/2005 | Ritt et al. | |
| 2005/0273779 A1 | 12/2005 | Cheng et al. | |
| 2005/0289540 A1 | 12/2005 | Nguyen et al. | |
| 2006/0031598 A1 | 2/2006 | Blanchard et al. | |
| 2006/0041881 A1 | 2/2006 | Adkasthala | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0101451 A1 | 5/2006 | Fong | |
| 2006/0130144 A1 | 6/2006 | Wernicke | |
| 2006/0146991 A1 | 7/2006 | Thompson et al. | |
| 2006/0155735 A1 | 7/2006 | Traut et al. | |
| 2006/0177058 A1 | 8/2006 | Sarwono et al. | |
| 2006/0195832 A1 | 8/2006 | Chandley et al. | |
| 2006/0218544 A1 | 9/2006 | Chakraborty et al. | |
| 2006/0218547 A1 | 9/2006 | Purkeypile et al. | |
| 2006/0224436 A1 | 10/2006 | Matsumoto et al. | |
| 2006/0236228 A1 | 10/2006 | Michelstein et al. | |
| 2006/0277542 A1 | 12/2006 | Wipfel | |
| 2007/0011291 A1 | 1/2007 | Mi et al. | |
| 2007/0028001 A1 | 2/2007 | Phillips et al. | |
| 2007/0053513 A1 | 3/2007 | Hoffberg | |
| 2007/0074201 A1 | 3/2007 | Lee | |
| 2007/0078988 A1 | 4/2007 | Miloushev et al. | |
| 2007/0101116 A1 | 5/2007 | Tsuji | |
| 2007/0105627 A1 | 5/2007 | Campbell | |
| 2007/0108627 A1 | 5/2007 | Kozaka et al. | |
| 2007/0150865 A1 | 6/2007 | Rajput | |
| 2007/0159650 A1 | 7/2007 | Takamatsu et al. | |
| 2007/0168926 A1 | 7/2007 | Rajah et al. | |
| 2007/0168962 A1 | 7/2007 | Heinke et al. | |
| 2007/0169079 A1 | 7/2007 | Keller et al. | |
| 2007/0226715 A1 | 9/2007 | Kimura et al. | |
| 2007/0245332 A1 | 10/2007 | Tal et al. | |
| 2007/0250672 A1 | 10/2007 | Stroberger et al. | |
| 2007/0283282 A1 | 12/2007 | Bonfiglio et al. | |
| 2007/0294314 A1 | 12/2007 | Padovano et al. | |
| 2007/0294676 A1 | 12/2007 | Mellor et al. | |
| 2008/0004904 A1 | 1/2008 | Tran | |
| 2008/0022271 A1 | 1/2008 | D'Angelo et al. | |
| 2008/0034364 A1 | 2/2008 | Lam et al. | |
| 2008/0052384 A1 | 2/2008 | Marl et al. | |
| 2008/0077605 A1 | 3/2008 | Vasu | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0086728 A1 | 4/2008 | Lam et al. | |
| 2008/0091613 A1 | 4/2008 | Gates et al. | |
| 2008/0104393 A1 | 5/2008 | Glasser et al. | |
| 2008/0104608 A1 | 5/2008 | Hyser et al. | |
| 2008/0109876 A1 | 5/2008 | Hitomi et al. | |
| 2008/0127087 A1 | 5/2008 | Brookins et al. | |
| 2008/0134178 A1 | 6/2008 | Fitzgerald et al. | |
| 2008/0178144 A1 | 7/2008 | Bazigos et al. | |
| 2008/0215796 A1 | 9/2008 | Lam et al. | |
| 2008/0240150 A1 | 10/2008 | Dias et al. | |
| 2008/0256516 A1 | 10/2008 | Chaar et al. | |
| 2008/0263258 A1 | 10/2008 | Allwell et al. | |
| 2009/0012885 A1 | 1/2009 | Cahn | |
| 2009/0013061 A1 | 1/2009 | Winter et al. | |
| 2009/0025006 A1 | 1/2009 | Waldspurger | |
| 2009/0037496 A1 | 2/2009 | Chong et al. | |
| 2009/0064086 A1 | 3/2009 | Faus et al. | |
| 2009/0083734 A1 | 3/2009 | Hotra | |
| 2009/0089078 A1 | 4/2009 | Bursey | |
| 2009/0089407 A1 | 4/2009 | Chalupa et al. | |
| 2009/0089738 A1 | 4/2009 | Krueger et al. | |
| 2009/0099940 A1 | 4/2009 | Frederick et al. | |
| 2009/0103722 A1 | 4/2009 | Anderson et al. | |
| 2009/0132695 A1 | 5/2009 | Surtani et al. | |
| 2009/0144718 A1 | 6/2009 | Boggs et al. | |
| 2009/0177514 A1 | 7/2009 | Hudis et al. | |
| 2009/0210527 A1 | 8/2009 | Kawato | |
| 2009/0210869 A1 | 8/2009 | Gebhart et al. | |
| 2009/0210875 A1 | 8/2009 | Bolles et al. | |
| 2009/0217244 A1 | 8/2009 | Bozak et al. | |
| 2009/0217255 A1 | 8/2009 | Troan | |
| 2009/0217263 A1 | 8/2009 | Gebhart et al. | |
| 2009/0217267 A1 | 8/2009 | Gebhart et al. | |
| 2009/0222805 A1 | 9/2009 | Faus et al. | |
| 2009/0222806 A1 | 9/2009 | Faus et al. | |
| 2009/0222808 A1 | 9/2009 | Faus et al. | |

(56) References Cited

U.S. PATENT DOCUMENTS

| | | |
|---|---|---|
| 2009/0228950 A1 | 9/2009 | Reed et al. |
| 2009/0248693 A1 | 10/2009 | Sagar et al. |
| 2009/0249279 A1 | 10/2009 | Bourdon |
| 2009/0249287 A1 | 10/2009 | Patrick |
| 2009/0249488 A1* | 10/2009 | Robinson ............ G06F 21/10 726/26 |
| 2009/0260007 A1 | 10/2009 | Beaty et al. |
| 2009/0265707 A1 | 10/2009 | Goodman et al. |
| 2009/0265756 A1 | 10/2009 | Zhang et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300164 A1 | 12/2009 | Boggs et al. |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300584 A1 | 12/2009 | Faus et al. |
| 2009/0300593 A1 | 12/2009 | Faus et al. |
| 2009/0300601 A1 | 12/2009 | Faus et al. |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2009/0327683 A1 | 12/2009 | Cabot et al. |
| 2010/0031234 A1 | 2/2010 | Chaar et al. |
| 2010/0042720 A1 | 2/2010 | Stienhans et al. |
| 2010/0049736 A1 | 2/2010 | Rolls et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0066677 A1 | 3/2010 | Garrett et al. |
| 2010/0095270 A1 | 4/2010 | Seitz et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0218237 A1 | 8/2010 | Ferris et al. |
| 2010/0220622 A1 | 9/2010 | Wei |
| 2010/0235482 A1 | 9/2010 | Chalupa et al. |
| 2010/0235813 A1 | 9/2010 | Manczak et al. |
| 2010/0299366 A1 | 11/2010 | Stienhans et al. |
| 2010/0299514 A1 | 11/2010 | Samba et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2010/0306773 A1 | 12/2010 | Lee et al. |
| 2011/0004676 A1 | 1/2011 | Kawato |
| 2011/0010420 A1 | 1/2011 | Kagitani |
| 2011/0016214 A1 | 1/2011 | Jackson |
| 2011/0035733 A1 | 2/2011 | Horning et al. |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0107103 A1 | 5/2011 | DeHaan et al. |
| 2011/0119651 A1 | 5/2011 | Utschig-Utschig et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2011/0153697 A1 | 6/2011 | Nickolov et al. |
| 2011/0167408 A1 | 7/2011 | Harmon |
| 2011/0170837 A1 | 7/2011 | Barnes, Jr. |
| 2011/0213686 A1 | 9/2011 | Ferris et al. |
| 2011/0213687 A1 | 9/2011 | Ferris et al. |
| 2011/0213691 A1 | 9/2011 | Ferris et al. |
| 2011/0213713 A1 | 9/2011 | Ferris et al. |
| 2011/0213719 A1 | 9/2011 | Ferris et al. |
| 2011/0213875 A1 | 9/2011 | Ferris et al. |
| 2011/0213884 A1 | 9/2011 | Ferris et al. |
| 2011/0214124 A1 | 9/2011 | Ferris et al. |
| 2011/0239190 A1 | 9/2011 | Mueller et al. |
| 2012/0131195 A1 | 5/2012 | Morgan |
| 2012/0246639 A1 | 9/2012 | Kashyap et al. |
| 2012/0260229 A1 | 10/2012 | Peraza et al. |

OTHER PUBLICATIONS

Robison, D. "Billing simulation tool for commercial buildings;" Nov. 7, 2001; Fairmont Press Inc., Strategic Planning for Energy and the Environment, Fall 2001, vol. 21, No. 2, pp. 47-65.

White Paper; VMware, "Best Practices for Building Virtual Appliances", 2007 VMware, Inc. pp. 1-7; <http://www.vmware.come/files/pdf/Best_Practices_Building_Virtual_Appliances.pdf>.

VMware, "User's Guide to Deploying vApps and Virtual Appliances", 2010 VMware, pp. 1-28; <http://www.vmware.com/support/developer/studio/studio21/va_user.pdf>.

White Paper; VMware, "Virtual Appliances: A New Paradigm for Software Delivery," 2008 VMware, Inc., pp. 1-14; <http://www.vmware.com/files/pdf/vam/VMware_Virtual_Appliance_Solutions_White_Paper_08Q3.pdf>.

Weis et al., "Customizable Pervasive Application", 2006 IEEE, PERCOM'06, pp. 1-6; <http://ieeexplore.ieee.org/stamp/stamp.jsp?tp=&arnumber=1604813>.

rBuilder and the rPath Appliance Platform, 2007 rPath, Inc., www.rpath.com, 3 pages.

"rBuilder 3.0 and rPath Appliance Platform Provide Revenue Growth and Channel Expansion Opportunities for ISVS", Feb. 12, 2007 rPath, Inc., www.rpath.com/corp/press-releases/2007-news/25-february-12-2007-rbuilder-30 . . . , 2 pages.

White Paper—"Best Practices for Building Virtual Appliances", 2008 rPath, Inc., www.rpath.com, 6 pages.

Healey, Matt; White Paper "Virtualizing Support", Mar. 2008, IDC, 9 pages.

Reimer, Darrell, et al., "Opening Black Boxes: Using Semantic Information to Combat Virtual Machine Image Sprawl," published in VEE'08 Proceedings of the fourth ACM SIGPLAN/SIGOPS international conference on Virtual execution environments, pp. 111-120, ACM New York, NY, USA © 2008, table of contents ISBN: 978-1-59593-796-4.

Gerla, Tim, Field Engineer, rPath, Inc. "From Application to Appliance Building Software Appliances with rPath's rBuilder," 15 pages, Apr. 14, 2008.

* cited by examiner

SOFTWARE APPLIANCE MANAGEMENT USING BROADCAST TECHNIQUE

RELATED APPLICATION

This continuation application claims priority to U.S. patent application Ser. No. 12/129,356 filed on May 29, 2008, and is incorporated by reference herein.

FIELD

The present teachings relate to techniques for managing software appliances distributed on a network, and more particularly to systems and methods for monitoring software appliance usage using a broadcast mechanism that communicates the state of software appliances installed in a network to an administrative monitor.

BACKGROUND OF RELATED ART

Software appliances generally involve the encapsulation of a pre-defined application or applications with a reduced version of an operating system (OS), such as the Linux™ operating system. Software appliances in one regard thereby represent a relatively compact, ready-to-install application solution and can be distributed via media such as CD-ROM discs, or downloaded for installation. Software appliances can be distributed and installed in a variety of environments, including stand-alone and networked environments.

Due in part to their compactness and ease of installation and configuration, software appliances are readily installed by a variety of users. However in a networked environment, that ease of installation can lead users to freely obtain and install a range of unapproved software appliances. In a controlled network environment, such as a large-scale corporate or government network or site, users can for example install unauthorized, incompatible, or uncertified types or versions of software appliances. For example, users may install software appliances of differing or incompatible versions, or software appliances that are not validated for security purposes.

Software appliances can be distributed with integral management tools that permit a user of a specific installation of that appliance to manage the operation of that appliance directly on that client or other host. However, it may be desirable to provide methods and systems to manage an entire population of software appliances on a network from a centralized monitor or host, including to track and prevent uncertified appliance installations on the network.

DESCRIPTION OF THE DRAWINGS

The accompanying drawings, which are incorporated in and constitute a part of this specification, illustrate embodiments of the present teachings and together with the description serve to explain the principles of the present teachings. In the figures.

DESCRIPTION OF EMBODIMENTS

Embodiments relate to systems and methods for software appliance management using a broadcast mechanism, in which a set of networked clients host sets of installed software appliances. Each client in the set of networked clients contains a broadcast module which communicates state information about the set of software appliances locally installed on that client, such as the identity of the one or more appliances, an execution state of those appliances, version numbers for those appliances, a client ID of the host client, an input/output (I/O) state of the appliance and/or client such as a list of active ports, or other metadata capturing the configuration or execution state of the installed appliances. The broadcast module in each client can transmit the appliance state information on a periodic or other basis to other clients in the network, as well as to a centralized appliance monitor communicating with the network. The appliance monitor can comprise a server or other workstation configured to listen on the network for the stream of appliance state data broadcast by clients populating the set of clients, and aggregate the states of appliances on individual clients to an aggregate state table representing the collective state of all software appliances executing on the network.

The software appliances themselves can comprise one or more applications combined with "minimum amount of an operating system" (MiniOS) to allow the embedded application(s) to run on a computing platform or in a virtual machine executing on a computing platform. The incorporated MiniOS can comprise a subset of the components of a complete OS that contains enough resources to support the application(s) intended to be encapsulated with a MiniOS in an appliance. A software appliance can therefore occupy less space than regular or self-standing applications and independent OSes.

A software appliance can be pre-configured for a specific client or computing platform on which it will be placed. Specifically, during creation of a software appliance, the embedded MiniOS and application(s) can be pre-configured with the settings and parameters of the client or computing platform on which it will be placed. For example, if software appliance includes a server OS and email server application, the server OS and email server application can be pre-configured to operate with the network settings of the computing platform it be placed and the network it will serve. Accordingly, a software appliance needs only to be placed on the target client or computing platform without additional configuration. In embodiments, a software appliance can be installed to a variety of clients, servers or other target devices, such as network servers, personal computers, network-enabled cellular telephones, personal digital assistants, media players, and others.

In general, the appliance monitor can check the aggregate state table representing the state of all appliances against a validation profile to determine whether the combined set of software appliances executing on the network being supervised are validated and/or operating properly. For example, the validation profile can validate versions of a given software appliance that are known to be compatible with the hardware or software requirements of the particular network whose group of appliances are being managed. The appliance monitor can transmit an appliance control instruction to the set of clients to correct or manage the state of software appliance installation or operation, such as for example to terminate uncertified appliances or to update selected clients with a newer validated version of an installed appliance. A systems administrator or other user can therefore operate the appliance monitor from a centralized location and manage and maintain the entire set of software appliance resources residing on the network, in a coordinated fashion. Also, because the appliance state information is broadcast or streamed from the client population on an automatic or continuous basis, unauthorized appliance use or other network faults or conditions can be detected and addressed relatively promptly. These and other embodiments described herein address the various noted shortcomings in know network management technology related to software appliances, and provide enhanced software appliance management tools and options.

Reference will now be made in detail to exemplary embodiments of the present teachings, which are illustrated in the accompanying drawings. Where possible the same reference numbers will be used throughout the drawings to refer to the same or like parts.

Figure 1:
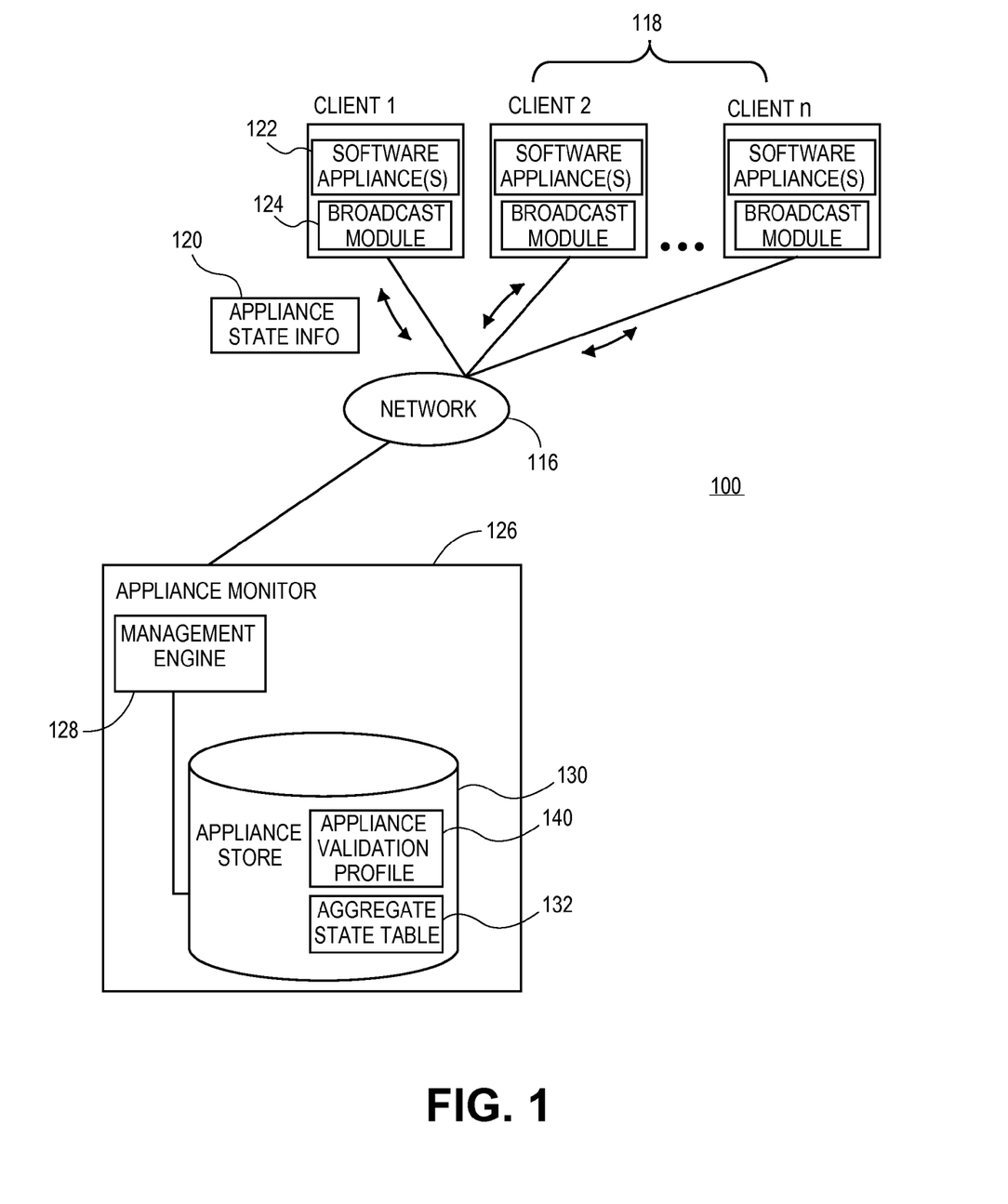
FIG. 1 illustrates an overall system for software appliance management using a broadcast mechanism, according to various embodiments.

FIG. 1 illustrates an overall system 100 consistent with various embodiments of systems and methods for software appliance management using a broadcast mechanism, according to embodiments of the present teachings. In embodiments as shown, a set of clients 118 can communicate with each other and with an appliance monitor 126 via network 116. Network 116 can be or include the Internet or other public network, a virtual private network (VPN) operating within a public network, a private network, or other network or connection. Each individual client in the set of clients 118 can be a personal computer, network-enabled cellular telephones, personal digital assistants, media players, or other devices. Each client in the set of clients 118 can contain or host an installed set of software appliances 122, as well as a broadcast module 124. Each set of software appliances 122 can comprise one or more difference software appliances of different types, for instance, an email client appliance, a browser appliance, a media player appliance, or others. Each set of software appliances 122 can comprise updates to the originally installed appliances.

The broadcast module 124 of each client can be configured to automatically transmit appliance state information 120 representing the configuration and/or execution state of the respective set of software appliances 122 installed on that client to the remainder of the set of clients 118, as well as to appliance monitor 126. Appliance state information 120 can for example contain metadata representing or encoding the execution state of a software appliance, the client ID on which the appliance is installed or executing, version information for the appliance, and other metadata characterizing or identifying attributes of the subject software appliance. In embodiments, broadcast module 124 can automatically transmit appliance state information 120 upon the instantiation of any software appliance on the associated local client. In embodiments, broadcast module 124 can be configured to transmit appliance state information 120 at other times, such as predetermined regular intervals, or at other times.

Appliance monitor 126 receives the incoming stream of appliance state information 120 from set of clients 118, and in embodiments aggregates that information in an appliance data store 130. Appliance monitor 126 can host a management engine 128 that receives appliance state information 120 and organizes appliance state information in an aggregate state table 132 encapsulating all appliance metadata received from all clients in the set of clients 118. Management engine 128 can be configured to examine any individual set of appliance state information 120 and/or aggregate state table 132 to carry out management functions for the software appliance pool installed on network 116. Management engine 128 can for instance track the identity, number type, and version information of the total installed set of software appliances to maintain consistent versions, to track upgrade histories or entitlements, to ensure security policies are maintained, or perform other management functions from one centralized station. In embodiments, management engine 128 can audit the collective software appliances aggregated form the reported set of software appliances 122 of each client to identify unauthorized or uncertified appliances executing on network 116. Management engine 128 can for instance check the identity of software appliances against an appliance validation profile 130 that can enumerate approved software appliances and identify those that are not authorized, certified or validated. Management engine 128 can then take supervisory action on network 116 when unauthorized appliances are detected, for instance to terminate or uninstall such versions.

Figure 2:
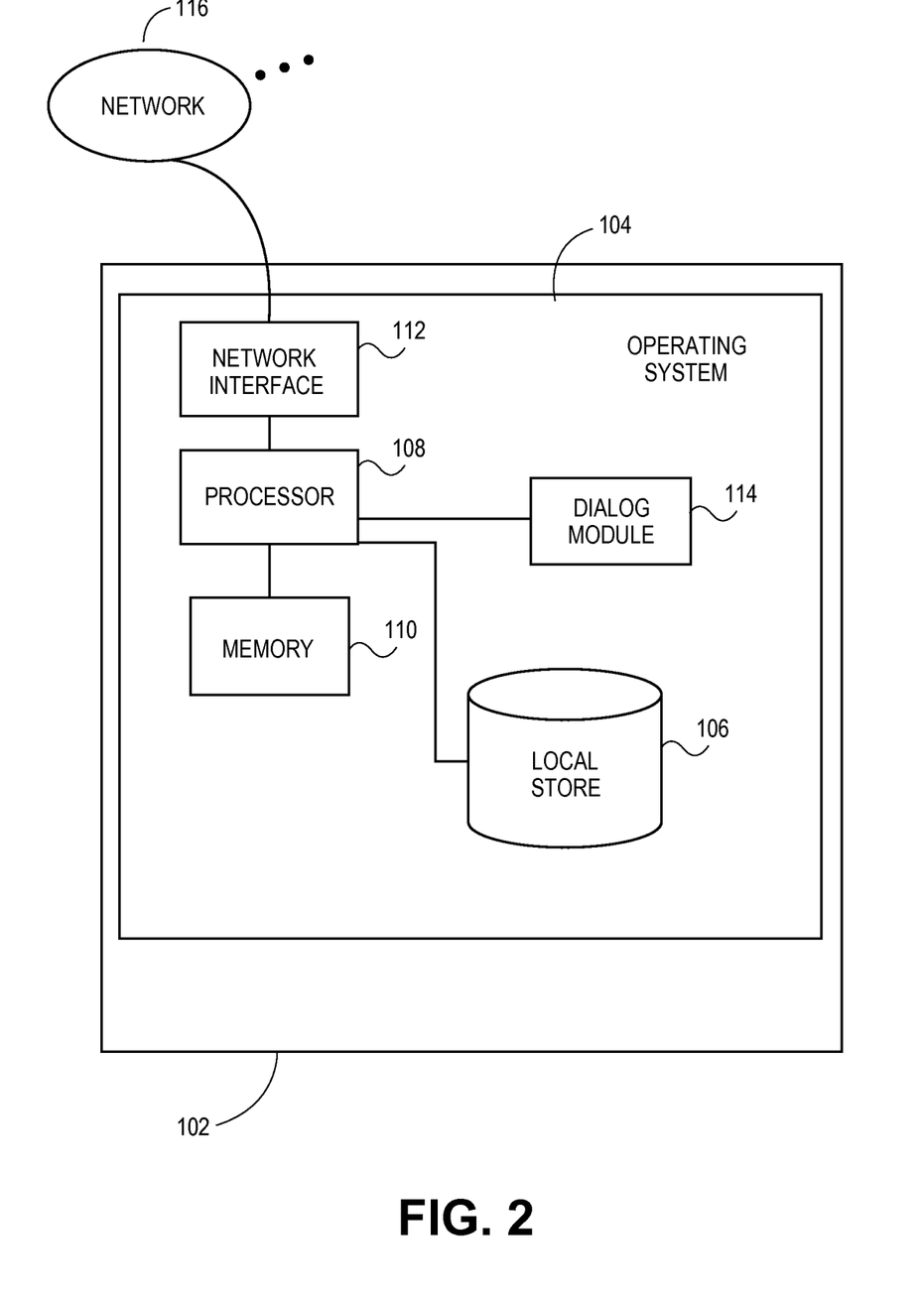
FIG. 2 illustrates an exemplary hardware configuration for a client, according to various embodiments.

FIG. 2 illustrates an illustrative configuration of hardware and other resources incorporated in an individual client 102 with which appliance monitor 126 can communicate via network 116, according to embodiments. In embodiments as shown, client 102 can comprise a processor 108 communicating with memory 110, such as electronic random access memory, operating under control of or in conjunction with operating system 104. Operating system 104 can be a distribution of the Linux™ operating system, the Unix™ operating system, or other open-source or proprietary operating system. Operating system 104 can present a user interface to accept user inputs and commands, and manage data storage, input/output (I/O), and other operations. Processor 108 also communicates with local data store 106, such as a database stored on a local hard drive. Processor 108 further communicates with network interface 112, such as an Ethernet or wireless data connection, which in turn communicates with network 116, such as the Internet or other public or private networks, to communicate with set of clients 118, in which client 102, appliance monitor 126, and other clients can reside. Other configurations of client 102, appliance monitor 126, associated networked connections, and other hardware and software resources are possible.

Figure 3:
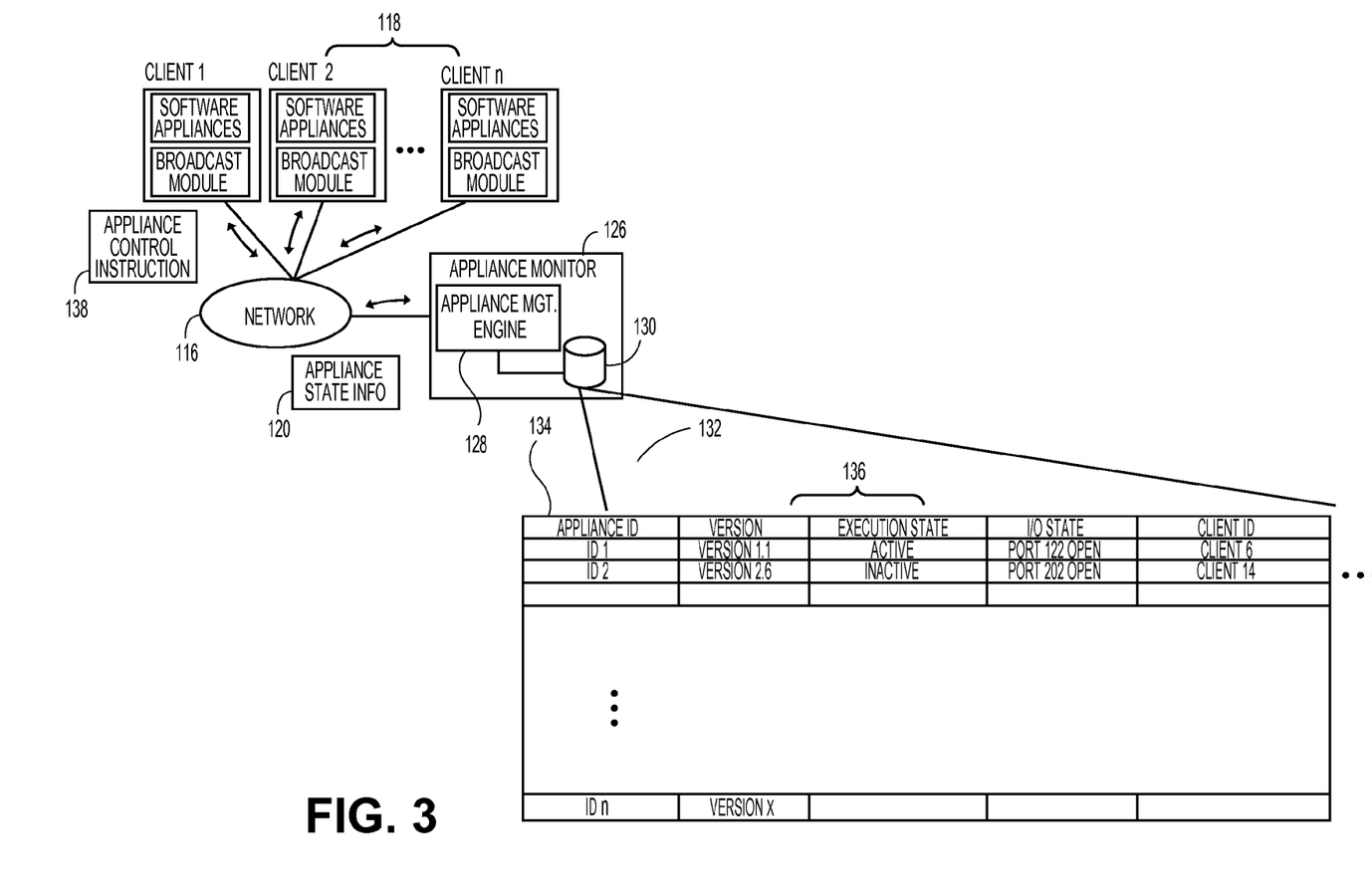
FIG. 3 illustrates an exemplary configuration of an appliance monitor and associated data store, according to various embodiments.

In terms of interaction between set of clients 118 and appliance monitor 126, in embodiments as shown in FIG. 3, management engine 128 can collect the incoming stream of appliance state information 120 and build aggregate state table 132 based on that information reported from set of clients 118. In embodiments, aggregate state table 132 can contain a software appliance ID 134 as a key field, as well as appliance metadata 136 consisting of fields of information representing aspects of the execution and/or execution state of an individual software appliance. Appliance metadata 136, as shown, can contain fields such as software appliance ID 134, a version field, an execution state field representing the execution state of a software appliance on a given client, the input/output (I/O) state of the appliance (e.g., active, inactive, suspended, terminated), the client ID of the hosting client, and other fields or data. In embodiments, other fields and/or configurations of aggregate state table 132 can be used.

Upon determination of the state of execution and/or configuration of a software appliance in aggregate state table 132, management engine 128 can generate and transmit an appliance control instruction 138 to the set of clients 118 via network 116. Appliance control instruction 138 can contain administrative or supervisory-level code or instructions for receipt and execution by clients in the set of clients 138. Appliance control instruction 138 can contain an instruction, for instance, to terminate and/or uninstall all instances of an appliance determined to be unauthorized or uncertified for use in network 116. Appliance control instruction 138 can contain other types of instructions or code, for example, instructions for maintenance or update procedures to take place in set of clients 118 at predetermined or other times. Other maintenance and management operations are possible.

Figure 4:
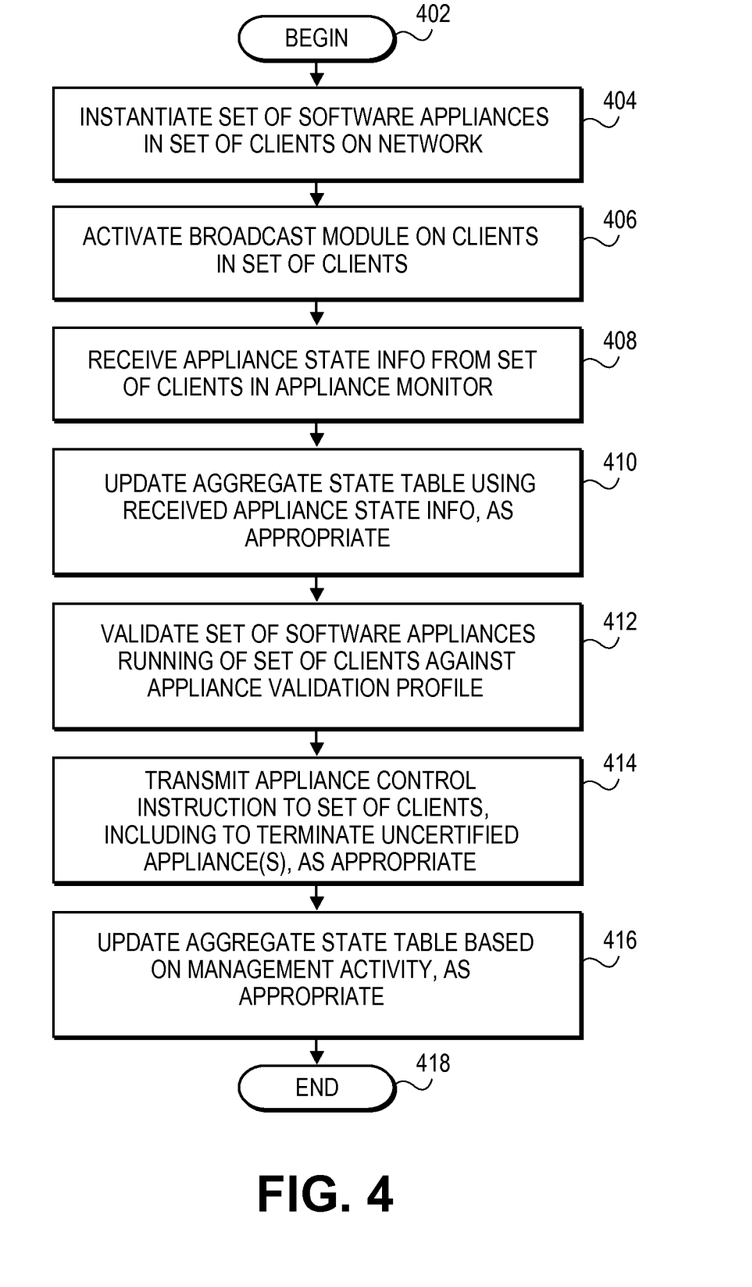
FIG. 4 illustrates a flow diagram of overall software appliance management using a broadcast mechanism, according to various embodiments.

FIG. 4 illustrates a flow diagram of overall software appliance management using a broadcast mechanism, according to various embodiments. In step 402, processing can begin. In step 404, the any one or more appliance in set of software appliances 122 installed on respective clients in set of clients 118 can be instantiated, for instance by user selection or automatic startup when the client device is booted or powered up. In step 406, the broadcast module 124 of each respective client in the set of clients 118 can be activated, for instance by automatic detection of a connection to network 116. In step 408, appliance state information 120 can be received by appliance monitor 126 from any one or more client in set of clients 118 indicating the execution state of one or more software appliances instantiated or installed on that client. In embodiments, appliance state information 120 can incorporate an appliance ID 134 such as a numeric code indicating the identity and/or version of a software appliance, a version number for the software appliance, an execution state of the appliance (e.g., active, inactive, suspended, terminated etc.), an input/output (I/O) state or configuration of the appliance (e.g., listing any active ports being listened to or transmitted on by the appliance), or other metadata or fields indicating the execution state of each enumerated software appliance. In embodiments, appliance state information 120 can be broadcast automatically and/or periodically by broadcast module 124 of each associated client, or can broadcast to other clients and/or appliance monitor 126 based on even triggers, such as initiation of or communication by an appliance.

In step 410, appliance monitor 126 can update aggregate state table 132 using any recently received appliance state information 120, as appropriate. In embodiments, updates to aggregate state table 132 can be initiated only upon detection of an incremental update to appliance state information 120 of any one or more appliance. In step 412, the set of software appliances 122 aggregated in aggregate state table 132 can be validated against appliance validation profile 140, for example to confirm that all executing appliances executing on set of clients 118 via network 126 are certified, authorized or otherwise validated software appliances. If an appliance does not validate against appliance validation profile 140, an exception can be registered to aggregate state table 132 or otherwise thrown.

In step 414, appliance monitor 126 can generate and transmit an appliance control instruction 138 to one or more respective clients in the set of clients 118. Appliance control instruction 138 can be or include, for instance, an instruction to terminate or suspend the execution of an uncertified software appliance detected on one or more respective clients in set of clients 118. In embodiments appliance control instruction 138 can be or include other instructions, for instance, to allocate a different port to an appliance, to adjust the amount of memory allocated to an appliance, to identify a data store from which the appliance will obtain data, or other commands, instructions, or configuration messages. In step 416, appliance monitor 126 can update aggregate state table 132 based on any administrative actions taken by appliance monitor 126 and/or any issued appliance control instruction 138, for instance to reflect newly deactivated appliances. In step 418, processing can repeat, return to a prior processing point, jump to a further processing point, or end, as understood by persons skilled in the art.

The foregoing description is illustrative, and variations in configuration and implementation may occur to persons skilled in the art. For example, while embodiments have been described in terms of the distribution and management of software appliances on a single network 116, in embodiments the inventive platform and techniques can manage a set of software appliances across multiple networks. Similarly, while embodiments have been described in which the appliance state information 130, management engine 128 and associated resources are hosted in a single appliance monitor 126, in embodiments the control logic used to track and manage the set of software appliances 122 can be distributed across multiple servers, sites or other resources. For further example, in embodiments management logic and other functions can be distributed to various clients within set of clients 118 itself, or to other platforms. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving a plurality of broadcasts comprising information identifying execution states and configurations associated with a plurality of virtual machines, each broadcast is from a client system of a plurality of client systems, wherein at least two of the plurality of virtual machines are installed on each of the plurality of client systems;
determining, by a processor, whether a first virtual machine of the plurality of virtual machines that is installed on a first client system of the plurality of client systems is associated with an unauthorized installation in view of an execution state associated with the first virtual machine and a configuration associated with a second virtual machine of the plurality of virtual machines; and
generating a control action for the first client system when the first virtual machine is determined to be associated with the unauthorized installation.

2. The method of claim 1, wherein the control action comprises an instruction to terminate execution of the first virtual machine.

3. The method of claim 1, wherein the control action comprises an instruction to uninstall the first virtual machine from the first client system.

4. The method of claim 1, wherein the control action comprises an instruction to install an updated copy of the first virtual machine on the first client system.

5. The method of claim 1, wherein the first virtual machine comprises a pre-configured application and a reduced operating system to support the pre-configured application.

6. The method of claim 1, wherein the determining whether the first virtual machine of the plurality of virtual machines that is installed on the first client system of the plurality of client systems is associated with the unauthorized installation is further in view of an input/output (I/O) state associated with the first virtual machine.

7. The method of claim 1, further comprising updating information associated with the execution state associated with the first virtual machine in view of the control action.

8. A method comprising:
receiving a plurality of broadcasts comprising information identifying execution states and configurations associated with a plurality of containers, each broadcast is from a client system of a plurality of client systems, wherein at least two of the plurality of containers are installed on each of the plurality of client systems;

determining, by a processor, whether a first container of the plurality of containers that is installed on a first client system of the plurality of client systems is associated with an unauthorized installation in view of an execution state associated with the first container and a configuration associated with a second container of the plurality of containers; and generating a control action for the first client system when the first container is determined to be associated with the unauthorized installation.

9. The method of claim 8, wherein the control action comprises an instruction to terminate execution of the first container.

10. The method of claim 8, wherein the control action comprises an instruction to uninstall the first container from the first client system.

11. The method of claim 8, wherein the control action comprises an instruction to install an updated copy of the first container on the first client system.

12. The method of claim 8, wherein the first container comprises a pre-configured application and a reduced operating system to support the pre-configured application.

13. The method of claim 8, wherein the determining whether the first container of the plurality of containers that is installed on the first client system of the plurality of client systems is associated with the unauthorized installation is further in view of an input/output (I/O) state associated with the first container.

14. The method of claim 8, further comprising updating information associated with the execution state associated with the first container in view of the control action.

15. A method comprising:

receiving a plurality of broadcasts comprising information identifying execution states and configurations of a plurality of software instances, each broadcast is from a client system of a plurality of client systems, wherein at least two of the software instances are installed on each of the plurality of client systems;

determining, by a processor, whether a first software instance of the plurality of software instances that is installed on a first client system of the plurality of client systems is unauthorized in view of an execution state of the first software instance and a configuration of a second software instance of the plurality of software instances; and generating a control action for the first client system when the first software instance is determined to be unauthorized.

16. The method of claim 15, wherein the control action comprises an instruction to terminate execution of the first software instance.

17. The method of claim 15, wherein the control action comprises an instruction to uninstall the first software instance from the first client system.

18. The method of claim 15, wherein the control action comprises an instruction to install an updated copy of the first software instance on the first client system.

19. The method of claim 15, wherein the first software instance comprises a pre-configured application and a reduced operating system to support the pre-configured application.

20. The method of claim 15, wherein the determining whether the first software instance of the plurality of software instances that is installed on the first client system of the plurality of client systems is unauthorized is further in view of an input/output (I/O) state of the first software instance.

* * * * *